(12) United States Patent
Atia et al.

(10) Patent No.: US 10,236,821 B1
(45) Date of Patent: Mar. 19, 2019

(54) MOUNTING APPARATUS TO SECURE SOLAR PANEL RAILS TO S-TILE ROOFS

(71) Applicants: Moti Atia, North Hollywood, CA (US); Netanel Levi, North Hollywood, CA (US)

(72) Inventors: Moti Atia, North Hollywood, CA (US); Netanel Levi, North Hollywood, CA (US)

(*) Notice: Subject to any disclaimer, the term of this patent is extended or adjusted under 35 U.S.C. 154(b) by 0 days.

(21) Appl. No.: 15/667,454

(22) Filed: Aug. 2, 2017

Related U.S. Application Data

(60) Provisional application No. 62/369,936, filed on Aug. 2, 2016.

(51) Int. Cl.
*F24S 25/634* (2018.01)
*H02S 20/23* (2014.01)
*H02S 30/10* (2014.01)
*F24S 25/35* (2018.01)
*F24S 25/636* (2018.01)

(52) U.S. Cl.
CPC .............. *H02S 20/23* (2014.12); *F24S 25/35* (2018.05); *F24S 25/636* (2018.05); *H02S 30/10* (2014.12); *F24S 25/634* (2018.05)

(58) Field of Classification Search
USPC ............. 248/214, 215, 226.11, 227.1, 227.2, 248/227.4, 228.1, 228.6, 231.71, 228.5, 248/229.24, 229.14, 229.15; 52/173.3
See application file for complete search history.

(56) References Cited

U.S. PATENT DOCUMENTS

| | | | | |
|---|---|---|---|---|
| 2,530,265 | A * | 11/1950 | Phalen | A01K 97/10 224/922 |
| 2,896,893 | A * | 7/1959 | Oliver | E06B 9/325 160/178.1 R |
| D260,235 | S * | 8/1981 | Anderson | D8/394 |
| 5,906,080 | A * | 5/1999 | diGirolamo | E04B 2/7453 411/546 |
| 9,954,479 | B1 * | 4/2018 | Atia | H02S 20/24 |

* cited by examiner

*Primary Examiner* — Alfred J Wujciak
(74) *Attorney, Agent, or Firm* — Plager Schack LLP; Mark H. Plager; Eric Liou

(57) ABSTRACT

A mounting apparatus to secure a pair of solar panel rails to a S-tile roof and minimize penetrations or damage to the roof's rafter is provided. The mounting apparatus includes a lower hook assembly with a plate coupled to the roof's rafter and an upright tab coupled to the plate, and an upper arm assembly coupled to the lower hook assembly's upright tab, the upper arm assembly having a generally U-shaped member with a first symmetric half member and a second symmetric half member, each symmetric half member having a slot to receive a fastener that secures one of the pair of solar panel rails thereto. The upper arm assembly is slidably mounted to the upright tab of the lower hook assembly to permit height adjustments of the upper arm assembly relative to the S-tile roof. The apparatus can also be used with M, W and clay tile roofs.

7 Claims, 3 Drawing Sheets

MOUNTING APPARATUS TO SECURE SOLAR PANEL RAILS TO S-TILE ROOFS

RELATED APPLICATION

The application claims priority to provisional patent application U.S. Ser. No. 62/369,936 filed on Aug. 2, 2016, the entire contents of which is herein incorporated by reference.

BACKGROUND

The embodiments herein relate generally to mounting apparatuses used to secure a solar panel rail to a roof.

Solar panels are generally positioned adjacent to each other and secured to the building's roof by rails and fasteners. In many instances, each solar panel is secured within a frame that is coupled to the building's roof by a plurality of solar panel rails and mounting devices. Each solar panel rail is mechanically fastened to a mounting device, which is coupled to a rafter of the roof by mechanical fasteners such as screws or bolts.

Current solar panel rail mounting devices are designed to support a single rail. Since each solar panel rail is coupled to a separate mounting device, the number of total penetrations into the roof's rafters by mechanical fasteners is increased. These added penetrations into the roof increase the amount of labor required to install the solar panels on the roof, the chance of leakage in the roof from precipitation, and likelihood of damage suffered by the roof's structural elements such as the rafters and/or other components.

As such, there is a need in the industry for a mounting apparatus that overcomes the limitations of the prior art, which permits the attachment of solar panel rails to S-tile roofs. There is a further need for the mounting apparatus to support a pair of solar panel rails thereon to minimize the amount of penetration and/or damage to the roof upon installation.

SUMMARY

A mounting apparatus to secure a pair of solar panel rails to a S-tile roof and minimize penetrations or damage to a rafter of the roof is provided. The mounting apparatus is configured to permit the pair of solar panel rails to support a pair of adjacent solar panels thereon. The mounting apparatus comprises a lower hook assembly comprising a plate coupled to the rafter of the S-tile roof and a generally upright tab coupled to the plate, and an upper arm assembly coupled to the generally upright tab of the lower hook assembly, the upper arm assembly comprising a generally U-shaped member comprising a first symmetric half member and a second symmetric half member, each symmetric half member of the first and second symmetric half members comprising a slot configured to receive a fastener that secures one of the pair of solar panel rails thereto, thereby permitting the mounting apparatus to support the pair of solar panel rails above the S-tile roof. In certain embodiments of the invention, the upper arm assembly is slidably mounted to the generally upright tab of the lower hook assembly to permit height adjustments of the upper arm assembly relative to the S-tile roof.

In alternative embodiments, the mounting apparatus can secure the pair of solar panel rails to other roofs including, but not limited to, M-tile, W-tile and clay tiles roofs.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
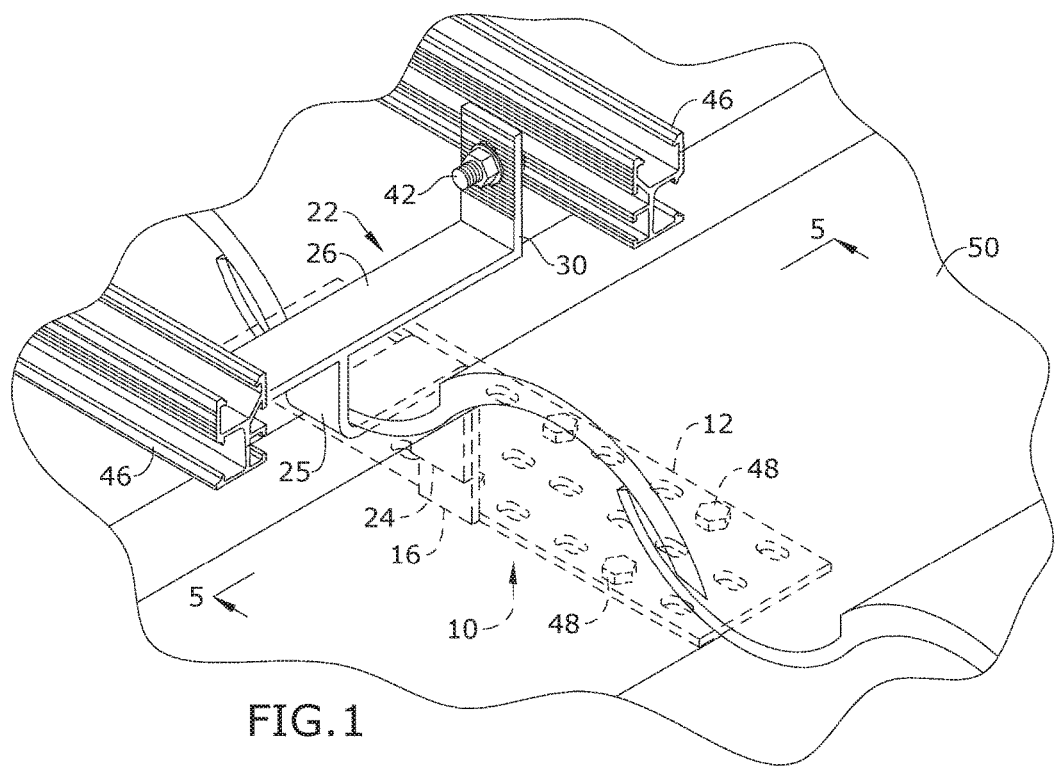
FIG. 1 depicts a perspective view of certain embodiments of the mounting apparatus shown in use.
Figure 2:
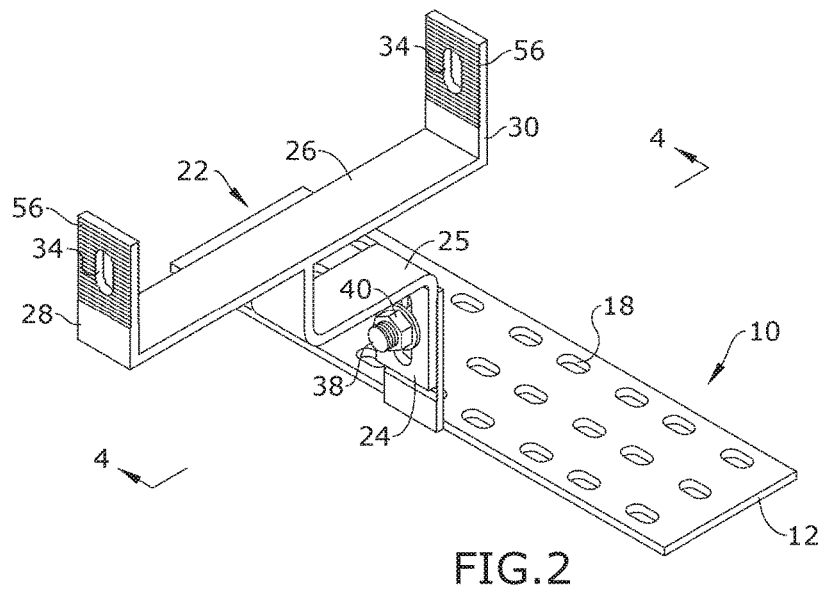
FIG. 2 depicts a perspective view of certain embodiments of the mounting apparatus.
Figure 3:
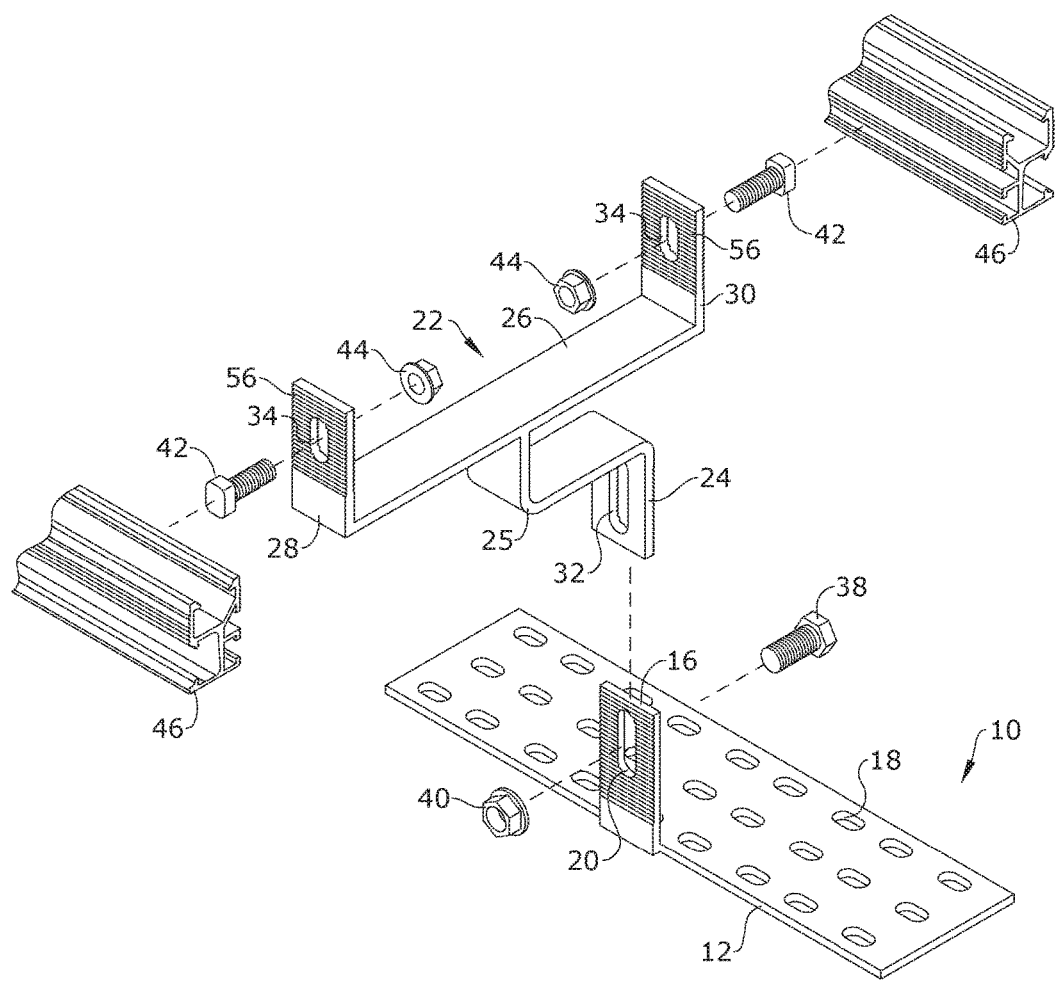
FIG. 3 depicts an exploded view of certain embodiments of the mounting apparatus.
Figure 4:
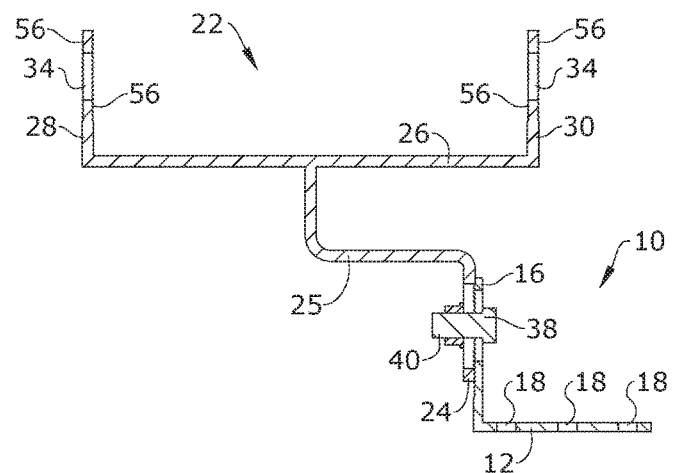
FIG. 4 depicts a section view of certain embodiments of the mounting apparatus taken along line 4-4 in FIG. 2.

As depicted in FIGS. 1-3, the mounting apparatus is configured to secure a pair of solar panel rails 46 above a roof comprising a plurality of S-tiles 50. In one embodiment, the pair of solar panel rails 46 is designed to support side portions of a pair of solar panels (not shown) positioned adjacent to each other. In certain embodiments, each solar panel may be disposed within a frame (not shown) that is secured to solar panel rail 46 by a fastener such as a clamp, bolt, or the like. It shall be appreciated that each solar panel may be coupled to one or more additional rails throughout the panel to provide additional support when securing the solar panel to the roof.

In certain embodiments, the mounting apparatus generally comprises lower hook assembly 10 and upper arm assembly 22 coupled together. The mounting apparatus is preferably made from 304 stainless steel. However, alternative materials may be used instead. Lower hook assembly 10 is coupled to the roof by screws 48. Upper arm assembly 22 is coupled to the pair of solar panel rails 46 by T-bolts 42 and nuts 44.

As depicted in FIGS. 1-4, lower hook assembly 10 comprises plate 12 continuously connected to upright hook tab 16. Plate 12 comprises a plurality of screw holes 18 configured to receive screws 48. Each screw hole 18 should be sufficiently large to receive screw 48, which is preferably a ⅜" screw. However, the size of screw holes 18 and screws 48 may vary. In one embodiment, screw holes 18 are aligned in rows and distributed throughout plate 12. Upright hook tab 16 is oriented generally perpendicular to the plane of plate 12 and comprises elongated hole 20, which is configured to receive connector bolt 38. In one embodiment, a plurality of grooves 56 surround elongated hole 20 on one side of upright hook tab 16. In an alternative embodiment, grooves 56 may surround elongated hole 20 on opposing sides of upright hook tab 16.

Upper arm assembly 22 comprises a generally U-shaped member comprising a pair of symmetric half members continuously connected together. Specifically, the U-shaped member comprises horizontal arm 26, first upright arm 28 and second upright arm 30. L-shaped bracket 25 comprises a first end continuously connected to the bottom surface of horizontal arm 26. Arm tab 24 is continuously connected to a second end of L-shaped bracket 25. In one embodiment, each bend present in the pair of bends in the continuous component formed by L-shaped bracket 25 and arm tab 24 bends approximately 87-93 degrees.

First upright arm 28 and second upright arm 30 comprise upright slots 34. Each upright slot 34 is sufficiently large to receive T-bolt 42, which is configured to be coupled to nut 44. In one embodiment, the inner and outer surfaces of first and second upright arms 28, 30 comprise a plurality of grooves 56 that surround upright slots 34. Arm tab 24 comprises elongated hole 32, which is configured to receive connector bolt 38.

Figure 5:
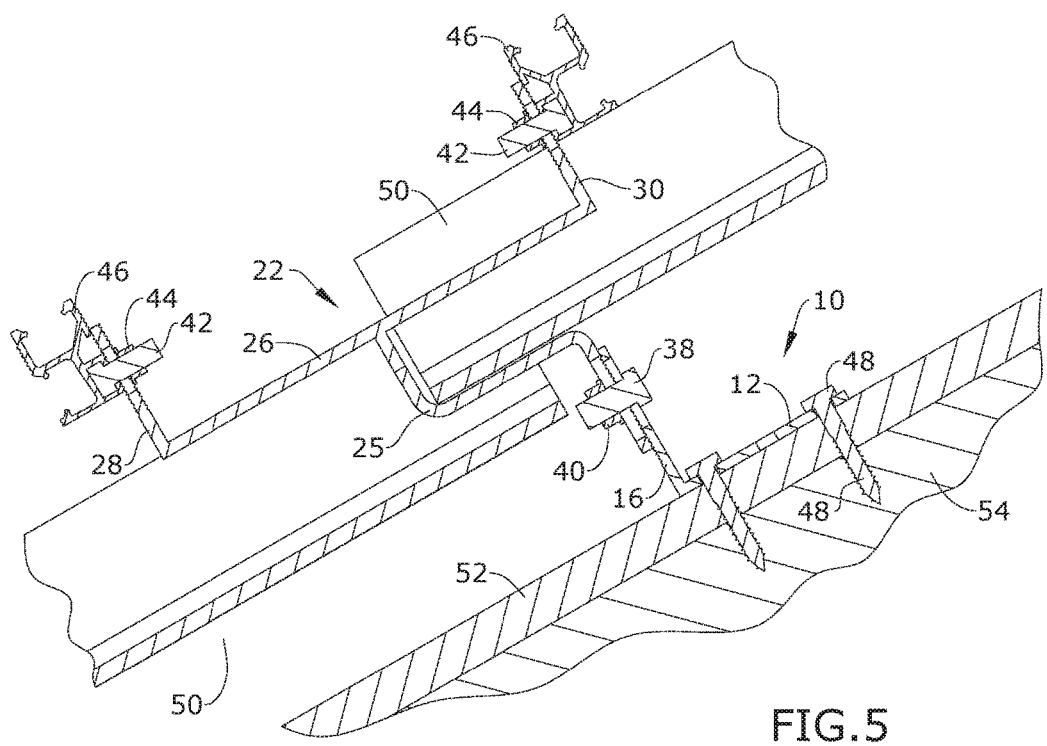
FIG. 5 depicts a section view of certain embodiments of the mounting apparatus taken along line 5-5 in FIG. 1.

In operation, one or more of the following steps may be performed to secure the mounting apparatus to the pair of solar panel rails 46 and the S-tile roof. First, a chalk line is generally disposed on the roof across S-tiles 50 to indicate the general location where solar panel rails 46 will be installed. One of the plurality of S-tiles 50 present beneath or near the chalk line is removed from the roof. As depicted in FIG. 5, this exposes portions of rafter 54 and weatherproof layer 52 of the roof. An instrument such as a stud finder may be used to directly locate the position of rafter 54. Once located, three ¼" pilot holes are drilled through weatherproof layer 52 and rafter 54. The ¼" drilled holes are backfilled with a sealant.

Lower hook assembly 10 is disposed on waterproof layer 52 such that some of screw holes 18 of plate 12 are aligned with the ¼" drilled holes in weatherproof layer 52 and rafter 54. Screws 48 are disposed through screw holes 18 of plate 12 and the pilot holes in waterproof layer 52 and rafter 54. The removed S-tile 50 is returned to the original position. Once this is completed, adjacent S-tiles 50 should be positioned above and below portions of L-shaped bracket 25.

Upper arm assembly 22 is coupled to lower hook assembly 10 by connector bolt 38 and nut 40. More specifically, connector bolt 38 is disposed through elongated hole 20 of lower hook assembly 10 and elongated hole 32 of upper arm assembly 22 and secured in place by nut 40. It shall be appreciated that arm tab 24 can be maneuvered up or down relative to upright hook tab 16 to adjust the height of upper arm assembly 22 to a desired position relative to the height of the S-tiles. Once the desired height is achieved and elongated hole 20 of lower hook assembly 10 is aligned with elongated hole 32 of upper arm assembly 22, connector bolt 38 is disposed therethrough and secured tightly with nut 40. This maintains upper arm assembly 22 in the desired position.

As depicted in FIGS. 1 and 5, a pair of solar panel rails 46 are coupled to upper arm assembly 22. A first solar panel rail 46 is coupled to first upright arm 28 of upper arm assembly 22 by T-bolt 42 and nut 44. T-bolt 42 extends through upright slot 34 in first upright arm 28 and is secured in place by nut 44. Similarly, a second solar panel rail 46 is coupled to second upright arm 30 of upper arm assembly 22 by T-bolt 42 and nut 44. T-bolt 42 extends through upright slot 34 in second upright arm 30 and is secured in place by nut 44. Although the figures depict solar panel rails 46 coupled to the outer surfaces of first and second upright arms 28, 30, it shall be appreciated that solar panel rails 46 can alternatively be coupled to the inner surfaces of first and second upright arms 28, 30.

It shall be appreciated that the mounting apparatus is beneficial because it can support a pair of solar panel rails 46 thereon while limiting the number of penetrations to three screws 48 at a single location in rafter 54. This minimizes leaks, damage and labor/maintenance costs of the S-tiled roof. Although the figures depict three screws 48 used to secure the mounting apparatus to rafter 54 of the S-tile roof, it shall be appreciated that an alternative number of screws 48 may be disposed through screw holes 18 in plate 12 and driven into rafter 54.

It shall be appreciated that multiple mounting apparatuses may be used to secure the solar panel rails to the roof as desired.

Alternative configurations of the mounting apparatus are within the scope of embodiments of the invention. For example, an alternative mounting bracket can be coupled to lower hook assembly 10 instead of upper arm assembly 22 to support a single solar panel rail 46. In alternative embodiments, the mounting apparatus can secure the pair of solar panel rails to other roofs including, but not limited to, M-tile, W-tile and clay tiles roofs.

It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting apparatus to secure a pair of solar panel rails to a S-tile roof and minimize penetrations or damage to a rafter of the roof, the mounting apparatus configured to permit the pair of solar panel rails to support a pair of adjacent solar panels thereon, the mounting apparatus comprising:
   a lower hook assembly comprising a plate coupled to the rafter of the S-tile roof and a generally upright tab coupled to the plate; and
   an upper arm assembly coupled to the generally upright tab of the lower hook assembly, the upper arm assembly comprising a generally U-shaped member comprising a first symmetric half member and a second symmetric half member, each symmetric half member of the first and second symmetric half members comprising a slot configured to receive a fastener that secures one of the pair of solar panel rails thereto, thereby permitting the mounting apparatus to support the pair of solar panel rails above the S-tile roof;
   wherein the upper arm assembly is slidably mounted to the generally upright tab of the lower hook assembly to permit height adjustments of the upper arm assembly relative to the S-tile roof, wherein the upper arm assembly comprises a generally L-shaped bracket continuously connected to a bottom surface of the U-shaped member and an arm tab continuously connected to the generally L-shaped bracket, the arm tab slidably mounted to the upright tab of the lower hook assembly.

2. The mounting apparatus of claim 1, further comprising a first elongated hole disposed in the arm tab of the upper arm assembly and a second elongated hole disposed in the generally upright tab of the lower hook assembly, wherein the first elongated hole is aligned with the second elongated hole.

3. The mounting apparatus of claim 2, further comprising a bolt disposed through the first and second elongated holes and coupled to a nut to detachably couple the arm tab of the upper arm assembly to the generally upright tab of the lower hook assembly.

4. The mounting apparatus of claim 3, further comprising a plurality of holes disposed in the plate of the lower hook assembly, each hole in the plurality of holes configured to receive a screw disposed therethrough to secure the lower hook assembly to the rafter of the S-tile roof.

5. The mounting apparatus of claim 4, further comprising a plurality of grooves disposed on a portion of an inner surface and a portion of an outer surface of each symmetric half member in the first and second half members of the upper arm assembly.

6. The mounting apparatus of claim 5, wherein the slot of each symmetric half member in the first and second half members is surrounded by the plurality of grooves.

7. The mounting apparatus of claim 6, wherein the upper arm assembly and lower hook assembly are made from 304 stainless steel.

\* \* \* \* \*